(12) United States Patent
Antunes et al.

(10) Patent No.: US 10,040,539 B2
(45) Date of Patent: Aug. 7, 2018

(54) ACTUATOR FOR CONTROLLING A HORIZONTAL STABILIZER OF AN AIRCRAFT

(71) Applicant: Safran Electronics & Defense, Boulogne-Billancourt (FR)

(72) Inventors: Bruno Antunes, Boulogne-Billancourt (FR); Christian Gouard, Boulogne-Billancourt (FR); Hervé Gorecki, Boulogne-Billancourt (FR); Jérôme Mehez, Boulogne-Billancourt (FR); Jesus-Angel Humanes, Boulogne-Billancourt (FR)

(73) Assignee: SAFRAN ELECTRONICS AND DEFENSE, Boulogne-Billancourt (FR)

( * ) Notice: Subject to any disclaimer, the term of this patent is extended or adjusted under 35 U.S.C. 154(b) by 122 days.

(21) Appl. No.: 15/112,668

(22) PCT Filed: Jan. 20, 2015

(86) PCT No.: PCT/EP2015/050945
§ 371 (c)(1),
(2) Date: Jul. 19, 2016

(87) PCT Pub. No.: WO2015/107208
PCT Pub. Date: Jul. 23, 2015

(65) Prior Publication Data
US 2016/0340026 A1 Nov. 24, 2016

(30) Foreign Application Priority Data

Jan. 20, 2014 (FR) .................................. 14 50421

(51) Int. Cl.
*B64C 9/00* (2006.01)
*B64C 13/28* (2006.01)
(Continued)

(52) U.S. Cl.
CPC ............... *B64C 13/28* (2013.01); *B64C 5/10* (2013.01); *B64C 13/42* (2013.01); *B64C 13/50* (2013.01);
(Continued)

(58) Field of Classification Search
CPC combination set(s) only.
See application file for complete search history.

(56) References Cited

U.S. PATENT DOCUMENTS 1,479,789 A * 1/1924 Collin ................... F16K 17/386
123/179.15
2,425,000 A * 8/1947 Paget ..................... B64D 13/02
123/70 R
(Continued)

FOREIGN PATENT DOCUMENTS

EP 1283384 A2 2/2003
EP 1283384 A3 8/2004

OTHER PUBLICATIONS

French Search Report with English Translation Cover Sheet, dated Oct. 9, 2014, FR Application No. 1450421.
(Continued)

*Primary Examiner* — Medhat Badawi
(74) *Attorney, Agent, or Firm* — Womble Bond Dickinson (US) LLP

(57) ABSTRACT

The invention relates to an actuator (4) for controlling a horizontal stabilizer (3) of an aircraft, including: a primary channel including a screw (6) and a primary nut (7), the primary nut (7) being suitable for engaging with the screw (6), such that a rotation of the screw (6) relative to the primary nut (7) about a rotation axis (X) causes the primary nut (7) to translate relative to the screw (6) along the axis (X), such as to move the horizontal stabilizer (3); a secondary channel including a secondary part (25, 28), and a housing (23, 26), the secondary part (25, 28) being mounted
(Continued)

Figure 1:
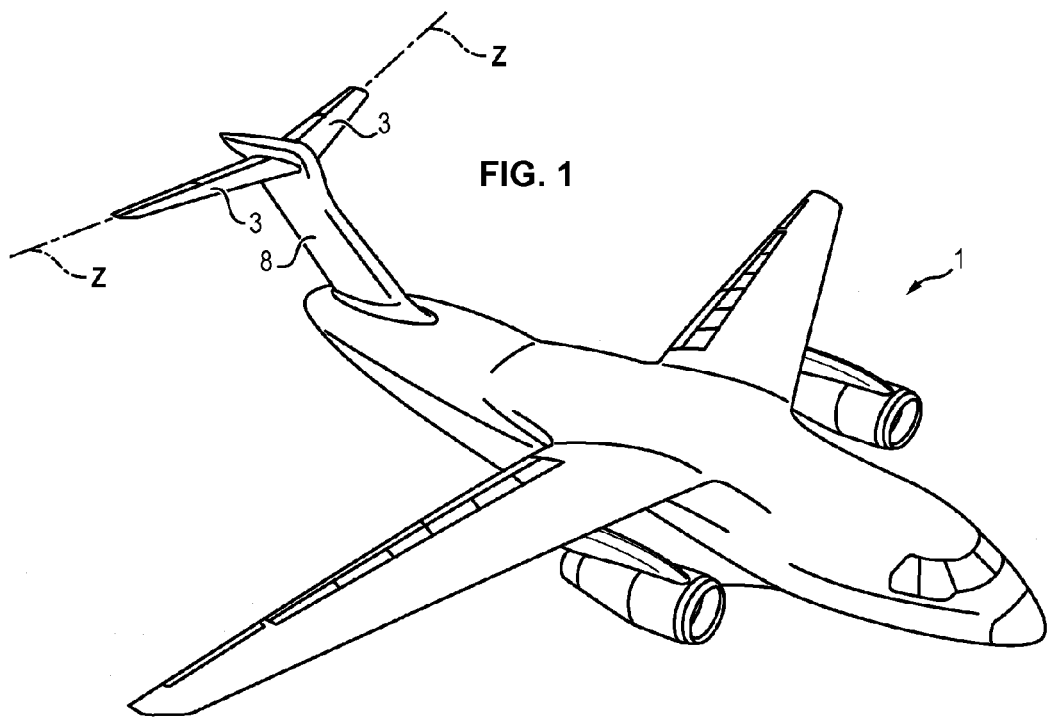

in the housing (23, 26) with play between the secondary part and the housing, in which the secondary channel also includes a play take-up device (27), configured to, in the event of a breakdown of the primary channel causing the secondary part (25, 28) to move relative to the housing, eliminate the play between the secondary part (25, 28) and the housing (23, 26) such as to keep the secondary part (25, 28) in contact with the housing (23, 26).

17 Claims, 9 Drawing Sheets

(51) Int. Cl.
    *F16H 25/24* (2006.01)
    *B64C 13/42* (2006.01)
    *F16H 25/20* (2006.01)
    *B64C 5/10* (2006.01)
    *B64C 13/50* (2006.01)
    *G01D 5/14* (2006.01)

(52) U.S. Cl.
    CPC ....... *F16H 25/205* (2013.01); *F16H 25/2472* (2013.01); *G01D 5/142* (2013.01)

(56) References Cited

U.S. PATENT DOCUMENTS

| | | | | | |
|---|---|---|---|---|---|
| 2,620,683 | A * | 12/1952 | Geyer | | B64C 25/24 |
| | | | | | 192/142 R |
| 2,717,494 | A * | 9/1955 | Doeg | | F25B 47/022 |
| | | | | | 137/457 |
| 3,143,126 | A * | 8/1964 | Terry | | F24H 9/20 |
| | | | | | 137/457 |
| 3,304,794 | A * | 2/1967 | Bird | | B66F 3/08 |
| | | | | | 74/409 |
| 3,313,312 | A * | 4/1967 | Weese | | G05D 23/022 |
| | | | | | 137/457 |
| 3,405,565 | A * | 10/1968 | De Valliere | | B23Q 11/04 |
| | | | | | 74/354 |
| 3,468,401 | A * | 9/1969 | Letz | | B66B 9/025 |
| | | | | | 187/268 |
| 3,485,110 | A * | 12/1969 | Beck | | B66F 3/18 |
| | | | | | 74/409 |
| 3,695,096 | A * | 10/1972 | Kutsay | | G01L 1/2225 |
| | | | | | 73/761 |
| 3,766,790 | A * | 10/1973 | Weir | | B64C 13/00 |
| | | | | | 475/6 |
| 4,256,277 | A * | 3/1981 | Embree | | B64D 45/0005 |
| | | | | | 244/213 |
| 4,318,509 | A * | 3/1982 | Patrick | | G05D 23/138 |
| | | | | | 137/85 |
| 4,549,717 | A * | 10/1985 | Dewaegheneire | | F16K 17/38 |
| | | | | | 137/457 |
| 4,603,594 | A * | 8/1986 | Grimm | | B64C 13/42 |
| | | | | | 188/106 P |
| 4,637,272 | A * | 1/1987 | Teske | | B64C 13/42 |
| | | | | | 192/48.9 |
| 4,644,811 | A * | 2/1987 | Tervo | | F16H 25/2015 |
| | | | | | 187/267 |
| 4,679,485 | A * | 7/1987 | Nelson | | B64C 13/42 |
| | | | | | 74/424.71 |
| 4,699,314 | A * | 10/1987 | Faurie | | F16K 31/002 |
| | | | | | 137/875 |
| 4,735,056 | A * | 4/1988 | Goodman | | B64D 13/08 |
| | | | | | 236/80 A |
| 4,745,815 | A * | 5/1988 | Klopfenstein | | B64C 13/38 |
| | | | | | 244/228 |
| 4,775,117 | A * | 10/1988 | Standke | | B64D 15/20 |
| | | | | | 244/134 B |
| 4,802,621 | A * | 2/1989 | Standke | | G05D 23/138 |
| | | | | | 137/625.3 |
| 4,841,209 | A * | 6/1989 | Poumakis | | G05B 9/02 |
| | | | | | 318/564 |
| 4,932,429 | A * | 6/1990 | Watanabe | | E03B 7/12 |
| | | | | | 116/218 |
| 5,144,851 | A * | 9/1992 | Grimm | | B64C 13/36 |
| | | | | | 74/89.26 |
| 5,255,882 | A * | 10/1993 | Schroppel | | B64C 13/28 |
| | | | | | 192/141 |
| 5,313,852 | A * | 5/1994 | Arena | | F16H 25/2018 |
| | | | | | 74/89.13 |
| 5,417,367 | A * | 5/1995 | Baclet | | F02M 31/07 |
| | | | | | 236/101 D |
| 5,628,477 | A * | 5/1997 | Caferro | | B64C 9/02 |
| | | | | | 244/195 |
| 5,719,566 | A * | 2/1998 | Readman | | B64D 45/0005 |
| | | | | | 244/178 |
| 5,878,949 | A * | 3/1999 | Matsui | | G05D 23/025 |
| | | | | | 137/509 |
| 6,085,871 | A * | 7/2000 | Karamata | | F16N 7/36 |
| | | | | | 137/807 |
| 6,234,034 | B1 * | 5/2001 | Ando | | F16H 25/2472 |
| | | | | | 187/267 |
| 6,241,231 | B1 * | 6/2001 | Schron, Jr. | | B25B 5/06 |
| | | | | | 269/216 |
| 6,367,253 | B2 * | 4/2002 | Kutlucinar | | F03G 7/065 |
| | | | | | 244/102 A |
| 6,389,915 | B1 * | 5/2002 | Wngett | | B64C 13/00 |
| | | | | | 74/424.71 |
| 6,427,712 | B1 * | 8/2002 | Ashurst | | E03B 7/10 |
| | | | | | 137/2 |
| 6,467,363 | B2 * | 10/2002 | Manzanares | | F16H 25/2454 |
| | | | | | 74/89.39 |
| 6,497,372 | B2 * | 12/2002 | Lee | | G05D 23/025 |
| | | | | | 236/101 D |
| 6,550,495 | B1 * | 4/2003 | Schulze | | F16K 17/38 |
| | | | | | 137/457 |
| 6,584,940 | B1 * | 7/2003 | Khadkikar | | F23M 9/003 |
| | | | | | 122/155.2 |
| 6,659,399 | B1 * | 12/2003 | Bagnoli | | B64C 13/30 |
| | | | | | 244/99.4 |
| 6,672,540 | B1 * | 1/2004 | Shaheen | | B64C 13/28 |
| | | | | | 244/87 |
| 6,704,624 | B2 * | 3/2004 | Ortega | | G05D 1/0077 |
| | | | | | 244/175 |
| 6,739,550 | B2 * | 5/2004 | Koizumi | | B64C 9/02 |
| | | | | | 244/215 |
| 6,851,648 | B2 * | 2/2005 | Perni | | B64C 13/28 |
| | | | | | 244/99.3 |
| 7,186,197 | B2 * | 3/2007 | Zordan | | B64C 13/28 |
| | | | | | 475/339 |
| 7,299,703 | B2 * | 11/2007 | Balasu | | G01N 3/56 |
| | | | | | 73/810 |
| 7,353,723 | B2 * | 4/2008 | Lardy | | F16H 25/2472 |
| | | | | | 340/438 |
| 7,410,132 | B1 * | 8/2008 | Flatt | | B64C 13/24 |
| | | | | | 244/195 |
| 7,610,828 | B2 * | 11/2009 | Wingett | | B64C 13/28 |
| | | | | | 192/56.5 |
| 7,680,565 | B2 * | 3/2010 | Balasu | | B60T 17/221 |
| | | | | | 244/75.1 |
| 7,789,345 | B2 * | 9/2010 | Matsui | | G05B 9/03 |
| | | | | | 244/99.4 |
| 7,866,602 | B2 * | 1/2011 | Port-Robach | | B64C 13/28 |
| | | | | | 244/99.2 |
| 7,930,949 | B2 * | 4/2011 | Singh | | F16H 25/20 |
| | | | | | 74/424.71 |
| 7,946,529 | B2 * | 5/2011 | Moalic | | B64C 13/28 |
| | | | | | 244/99.2 |
| 8,291,782 | B1 * | 10/2012 | Shaheen | | B64C 13/28 |
| | | | | | 74/89.23 |
| 8,702,034 | B2 * | 4/2014 | Moulon | | B64C 13/28 |
| | | | | | 244/99.2 |
| 8,820,172 | B2 * | 9/2014 | Bouillot | | B64C 9/02 |
| | | | | | 73/761 |
| 8,960,031 | B2 * | 2/2015 | Keech | | B64C 5/02 |
| | | | | | 244/99.3 |

(56) References Cited

U.S. PATENT DOCUMENTS

| | | | |
|---|---|---|---|
| 9,062,748 B1* | 6/2015 | Guglietti | F16H 25/2214 |
| 9,279,487 B1* | 3/2016 | Guglietti | F16H 25/2214 |
| 9,334,675 B2* | 5/2016 | Koehler | E05B 47/0009 |
| 9,617,921 B2* | 4/2017 | Biyani | F02C 9/18 |
| 9,685,838 B2* | 6/2017 | Ueyama | H02K 7/06 |
| 9,797,490 B2* | 10/2017 | Marvin | F16H 25/205 |
| 2002/0182006 A1* | 12/2002 | Capewell | F16H 25/2204 403/403 |
| 2003/0029258 A1* | 2/2003 | Davies | B64C 9/02 74/89.26 |
| 2003/0145667 A1* | 8/2003 | Donald | F16K 31/047 74/89.26 |
| 2004/0004163 A1* | 1/2004 | Davies | B64C 13/32 244/217 |
| 2005/0016305 A1* | 1/2005 | Lardy | F16H 25/2472 74/89.42 |
| 2005/0229729 A1* | 10/2005 | Zordan | B64C 13/28 74/25 |
| 2006/0166746 A1* | 7/2006 | Zordan | F16D 7/025 464/30 |
| 2007/0018040 A1* | 1/2007 | Wingett | B64C 13/00 244/99.4 |
| 2007/0028964 A1* | 2/2007 | Vasquez | F03G 7/065 137/457 |
| 2007/0193381 A1* | 8/2007 | Rodrigues | B64C 13/28 74/89.26 |
| 2007/0278465 A1* | 12/2007 | Letellier | B66F 7/14 254/98 |
| 2008/0116317 A1* | 5/2008 | Steinberg | B64C 13/30 244/99.3 |
| 2008/0168852 A1* | 7/2008 | Chen | F16H 25/2472 74/89.23 |
| 2008/0179971 A1* | 7/2008 | Quitmeyer | B64C 13/28 310/20 |
| 2008/0197329 A1* | 8/2008 | Brechelente | B66F 3/08 254/98 |
| 2008/0265091 A1* | 10/2008 | Port-Robach | B64C 13/28 244/99.4 |
| 2008/0315040 A1* | 12/2008 | Moalic | B64C 13/28 244/220 |
| 2009/0041561 A1* | 2/2009 | Port-Robach | B64C 13/28 411/204 |
| 2009/0114549 A1* | 5/2009 | Albright, Jr. | B24B 37/16 205/710 |
| 2009/0152394 A1* | 6/2009 | Frank | B64C 25/22 244/58 |
| 2010/0001125 A1* | 1/2010 | Cavalier | B64C 13/28 244/99.3 |
| 2010/0096498 A1* | 4/2010 | McKay | B64C 13/28 244/99.2 |
| 2010/0125380 A1* | 5/2010 | Brueckner | B64C 13/28 701/3 |
| 2010/0213310 A1* | 8/2010 | Flatt | B64C 13/50 244/99.2 |
| 2010/0250047 A1* | 9/2010 | Balasu | B60T 17/221 701/31.4 |
| 2010/0264263 A1* | 10/2010 | Shaheen | B64C 13/24 244/99.3 |
| 2010/0313689 A1* | 12/2010 | Quenerch'du | B64C 13/28 74/89.39 |
| 2011/0006154 A1* | 1/2011 | Maresko | B64C 13/28 244/99.2 |
| 2011/0041632 A1* | 2/2011 | Baker | B64C 13/28 74/89.23 |
| 2011/0048147 A1* | 3/2011 | Keech | B64C 5/02 74/89.26 |
| 2011/0057550 A1* | 3/2011 | Biehl | F16H 25/2472 310/68 B |
| 2011/0068221 A1* | 3/2011 | Recksiek | B64C 13/42 244/99.5 |
| 2011/0132106 A1* | 6/2011 | Moulon | B64C 13/28 73/862.381 |
| 2012/0234117 A1* | 9/2012 | Oswald | E21B 41/0007 74/89.39 |
| 2012/0292155 A1* | 11/2012 | Gunter | B64C 13/50 192/82 T |
| 2012/0304787 A1* | 12/2012 | Quenerch'du | B64C 13/28 74/89.34 |
| 2013/0001357 A1* | 1/2013 | Cyrot | B64C 13/28 244/99.4 |
| 2013/0105623 A1* | 5/2013 | Moulon | B64C 13/28 244/99.4 |
| 2013/0313358 A1* | 11/2013 | Hale | B64C 13/28 244/99.3 |
| 2013/0336816 A1* | 12/2013 | Fukui | B64C 13/42 417/410.1 |
| 2014/0021289 A1* | 1/2014 | Bugge | F42B 10/14 244/3.24 |
| 2014/0138481 A1* | 5/2014 | Sakota | B64C 13/28 244/99.3 |
| 2014/0326828 A1* | 11/2014 | Senegas | B64C 13/28 244/99.3 |
| 2015/0041278 A1* | 2/2015 | Naubert | F16D 11/12 192/85.63 |
| 2015/0060602 A1* | 3/2015 | Naubert | F16H 25/2025 244/99.3 |
| 2015/0210379 A1* | 7/2015 | Henning | B64C 9/22 244/214 |
| 2015/0308549 A1* | 10/2015 | Hirai | F16H 25/205 74/89.29 |
| 2016/0025199 A1* | 1/2016 | Boone | F16H 25/2204 74/89.38 |
| 2016/0304188 A1* | 10/2016 | Moulon | B64C 13/28 |
| 2016/0308422 A1* | 10/2016 | Viennot | H02K 5/225 |
| 2016/0340026 A1* | 11/2016 | Antunes | F16H 25/205 |
| 2017/0067725 A1* | 3/2017 | Hammond | F42B 10/14 |
| 2017/0211551 A1* | 7/2017 | Albright | F42B 10/14 |

OTHER PUBLICATIONS

International Search Report with English Language Translation, dated Jul. 29, 2015, PCT Application No. PCT/EP2015/050945.

* cited by examiner

SECTION A-A

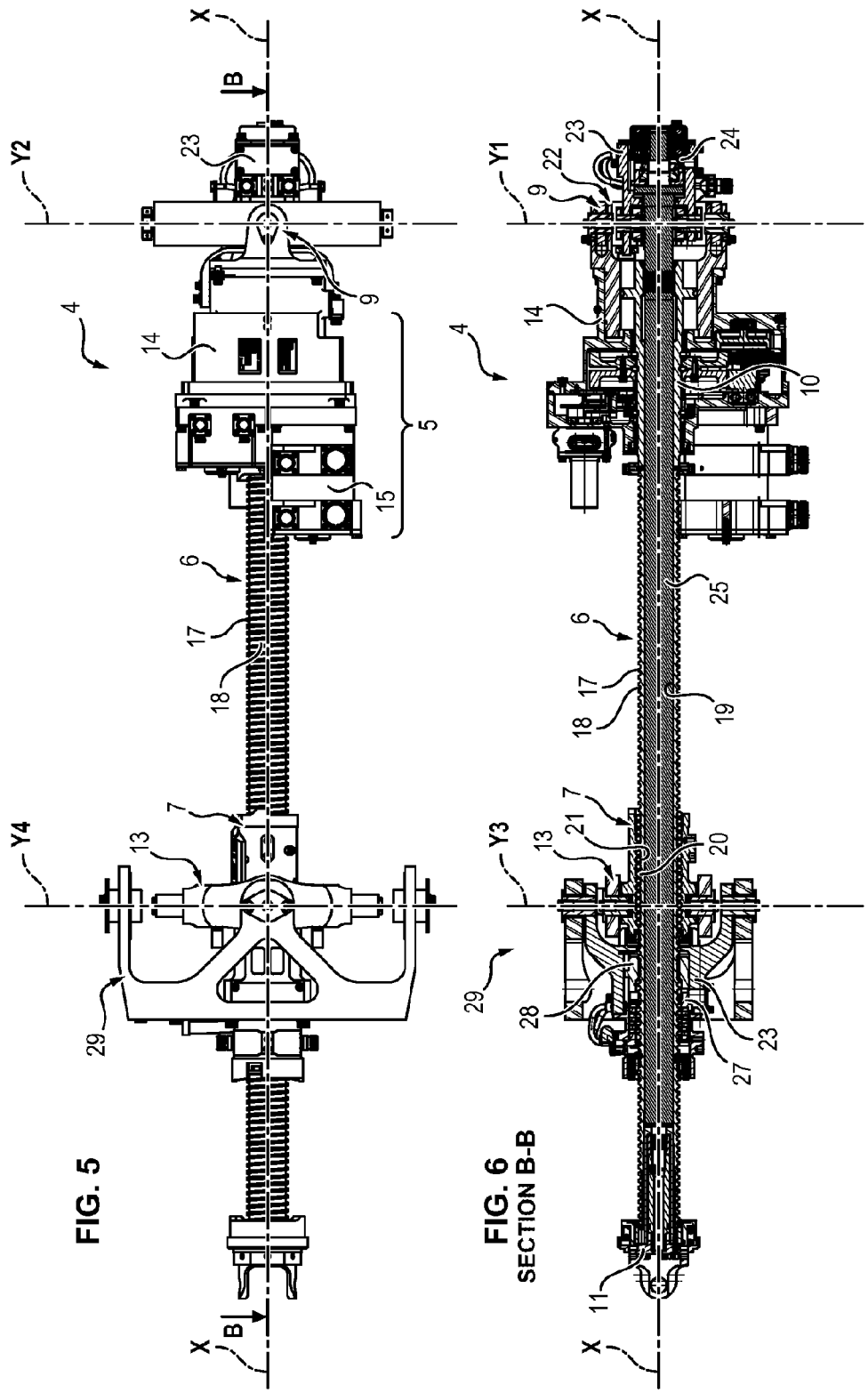

SECTION A-A

ACTUATOR FOR CONTROLLING A HORIZONTAL STABILIZER OF AN AIRCRAFT

FIELD OF THE INVENTION

The invention relates to an actuator for controlling a horizontal stabilizer of an aircraft, and a stabilization assembly comprising such an actuator.

PRIOR ART

In aircraft, the purpose of the horizontal stabilizer, located to the rear of the craft, is to ensure trimming of the aircraft in flight phase.

The horizontal stabilizer is pivotably mounted relative to the fuselage of the aircraft and is actuated mechanically by a horizontal stabilizer trim actuator (HSTA).

The actuator generally comprises a screw connected to the fuselage of the aircraft and a nut connected to the horizontal stabilizer. The screw is driven in rotation by a motor control unit (MCU) as a function of the commands generated by the pilot. Rotation of the screw causes translation of the nut along the screw, the effect of which pivots the horizontal stabilizer relative to the fuselage.

The loss of mechanical connection between the structure of the aircraft and the horizontal stabilizer is a catastrophic event. This is why horizontal stabilizer actuators generally comprise two mechanical paths: a "main path" (or "primary path") and a "secondary path" intended to take over the primary path in case of breaking of the primary path.

However, in the majority of known actuators the two paths comprise common parts which are stressed both during operation of the primary path and during operation of the secondary path. These are especially connecting parts connecting the actuator to the fuselage of the aircraft and to the horizontal stabilizer. In case of breaking of a common part, the two paths become unavailable.

Also, it is generally not possible to detect engagement of the secondary path such that the pilot is not informed of the breakdown.

SUMMARY OF THE INVENTION

An aim of the invention is to propose a control actuator of a horizontal stabilizer for limiting stresses applied to the parts of the secondary path.

This problem is resolved within the scope of the present invention by way of a control actuator of a horizontal stabilizer of an aircraft, comprising:
- a primary path comprising a screw and a primary nut, the primary nut being capable of cooperating with the screw such that rotation of the screw relative to the primary nut along an axis of rotation causes translation of the primary nut relative to the screw along the axis, to move the horizontal stabilizer,
- a secondary path comprising a secondary part and a housing, the secondary part being mounted in the housing with a clearance between the secondary part and the housing, wherein the secondary path further comprises a clearance take-up device, the clearance take-up device comprising a clearance take-up part having a tightening ramp inclined relative to the axis, the clearance take-up device being arranged, in case of breaking of the primary path causing displacement of the secondary part relative to the housing along the axis in a first direction tending to reduce the clearance between the secondary part and the housing, to move the clearance take-up part towards a blocking position in which the clearance take-up part prevents displacement of the secondary part relative to the housing in a second direction, opposite the first direction, the clearance take-up part tightening the secondary part against the housing by means of the tightening ramp so as to keep the secondary part in contact with the housing.

In such an actuator, the clearance between the secondary part and the housing preserves the secondary part from any stress as long as the secondary path is not engaged. In case of breaking of the primary path, the clearance take-up device puts the secondary part and the housing in contact by suppressing the clearance, which controls the horizontal stabilizer via the secondary path.

Also, the tightening ramp ensures complete take-up of the clearance between the secondary part and the housing, including clearance due to machining tolerances of the parts and deformations of the parts of the actuator under aerodynamic forces, which avoids floating of the horizontal stabilizer.

The actuator can further have the following characteristics:
- the clearance take-up part is rotatably mounted relative to the housing between a cocked position enabling the clearance between the secondary part and the housing and the blocking position,
- the clearance take-up part is rotatably mounted about an axis of rotation parallel to the axis of rotation of the screw,
- the tightening ramp is a helical ramp,
- the clearance take-up device comprises an elastic return element arranged to urge the clearance take-up part towards the blocking position,
- the elastic return element comprises a torsion spring,
- the clearance take-up device comprises a second clearance take-up part movably mounted in translation relative to the housing, between a first position in which the second clearance take-up part is engaged with the first clearance take-up part to keep the first clearance take-up part in a cocked position, and a second position in which the second clearance take-up part is freed from the first clearance take-up part to enable displacement of the first clearance take-up part towards the blocking position,
- the first clearance take-up part comprises teeth and the second clearance take-up part comprises teeth capable of engaging with the teeth of the first clearance take-up part when second clearance take-up part is in the first position so as to prevent displacement of the first clearance take-up part towards the blocking position,
- the second clearance take-up part comprises a ramp capable of cooperating with the ramp of the first clearance take-up part to clamp the secondary part against the housing,
- the secondary part is a rod extending inside the screw,
- the primary path comprises a primary universal joint to connect the screw to the fuselage of the aircraft, and the secondary path comprises a secondary universal joint to connect the housing to the fuselage, the primary universal joint and the secondary universal joint having coincident axes of rotation,
- the secondary part is a secondary nut capable of cooperating with the screw such that rotation of the screw relative to the secondary nut along the axis of rotation of the screw causes translation of the secondary nut relative to the screw along the axis, the primary path comprises a primary universal joint to connect the primary nut to the horizontal stabilizer, and the secondary path comprises a secondary universal joint to connect the housing to the horizontal stabilizer, the primary universal joint and the secondary universal joint having coincident axes of rotation, the housing comprises a window enabling insertion of a tool inside the housing to return the first clearance take-up part to the cocked position, the actuator comprises one or more position sensors for detecting the position of the first clearance take-up part, the first clearance take-up part comprises one or more magnets and the position sensor(s) are Hall-effect sensors for detecting the presence of the magnet(s) when the magnet(s) is(are) positioned facing the sensor(s).

The invention also relates to a horizontal stabilization assembly of an aircraft, comprising:

a horizontal stabilizer of the aircraft, and a control actuator such as defined previously to move the horizontal stabilizer.

PRESENTATION OF THE DRAWINGS

Figure 2:
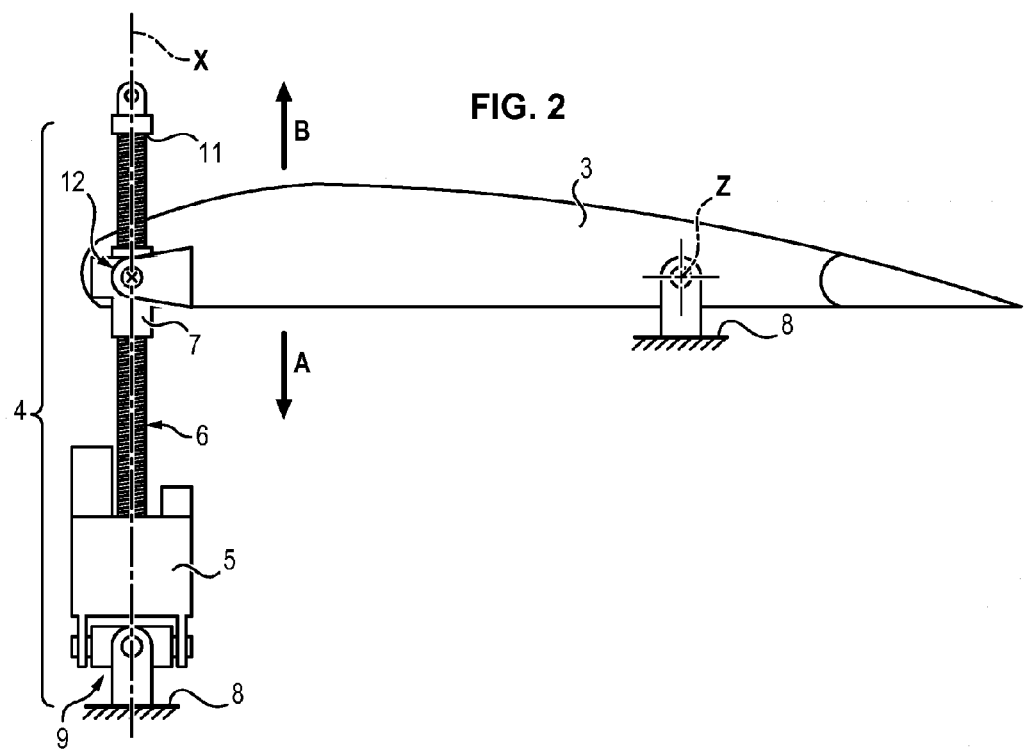
Figure 3:
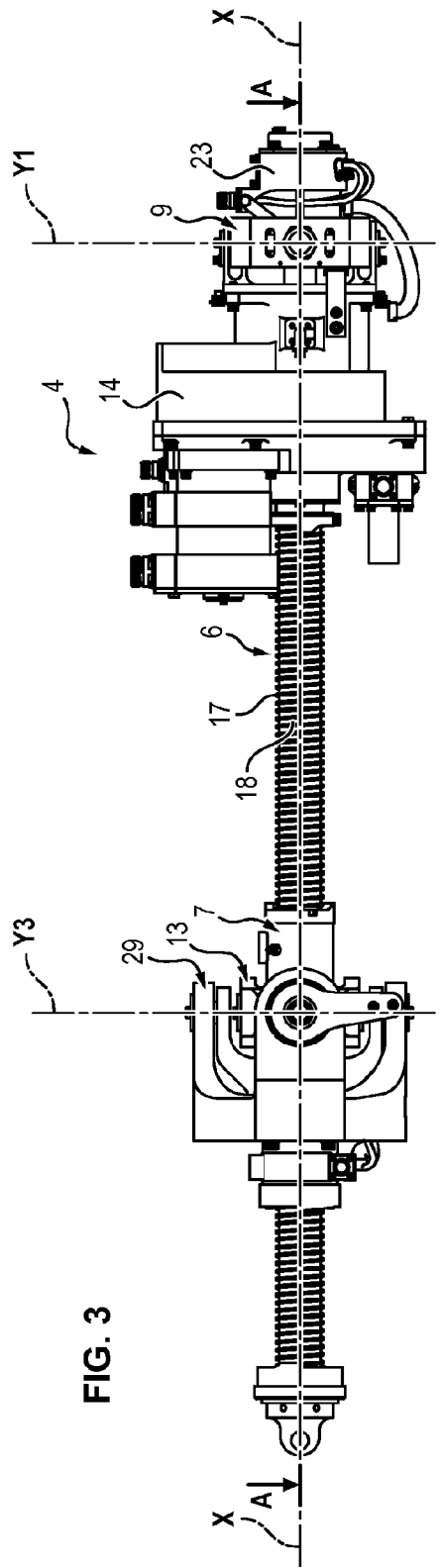
Figure 4:
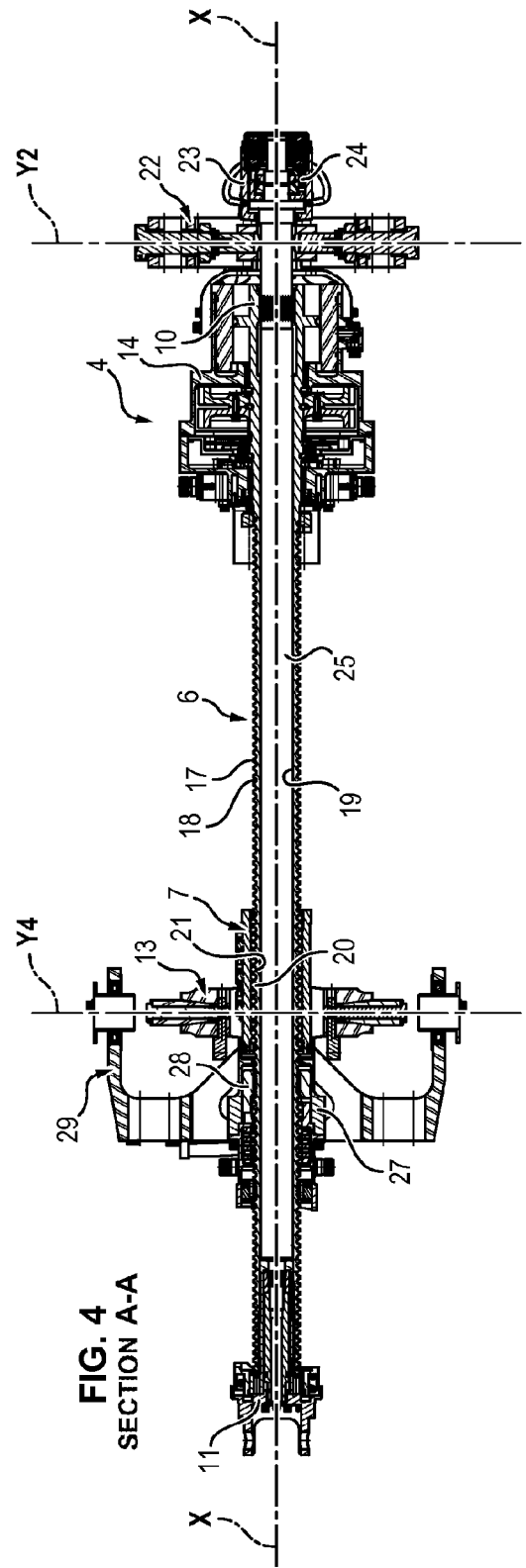
Figure 7:
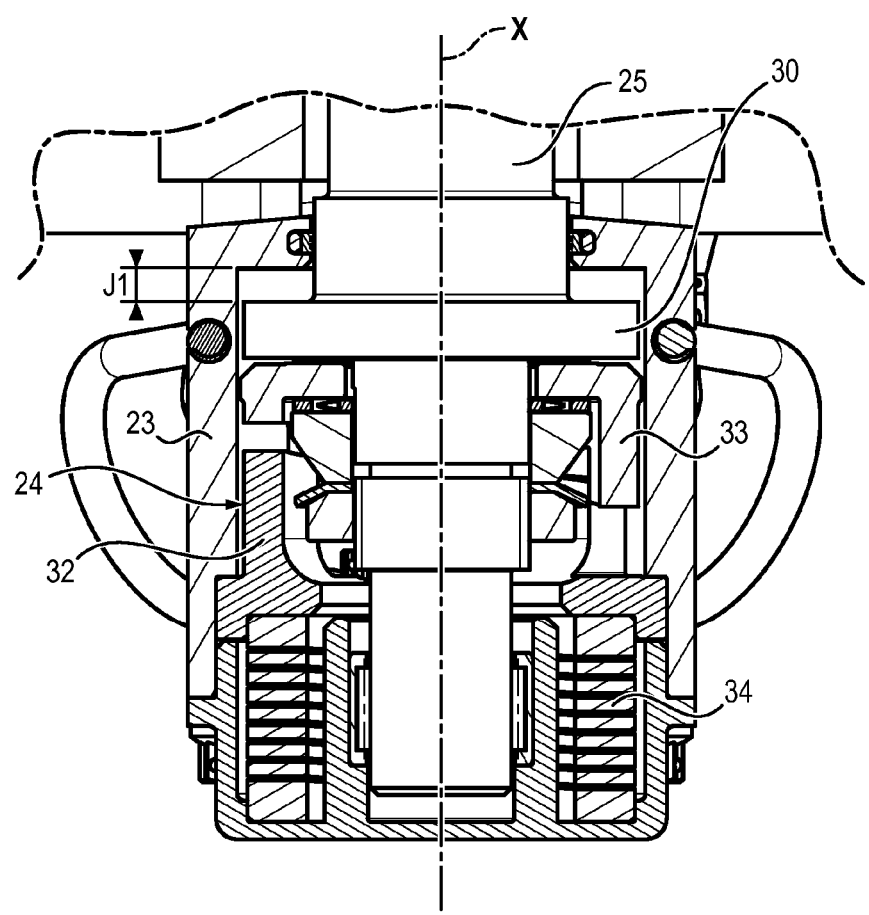
Figure 8:
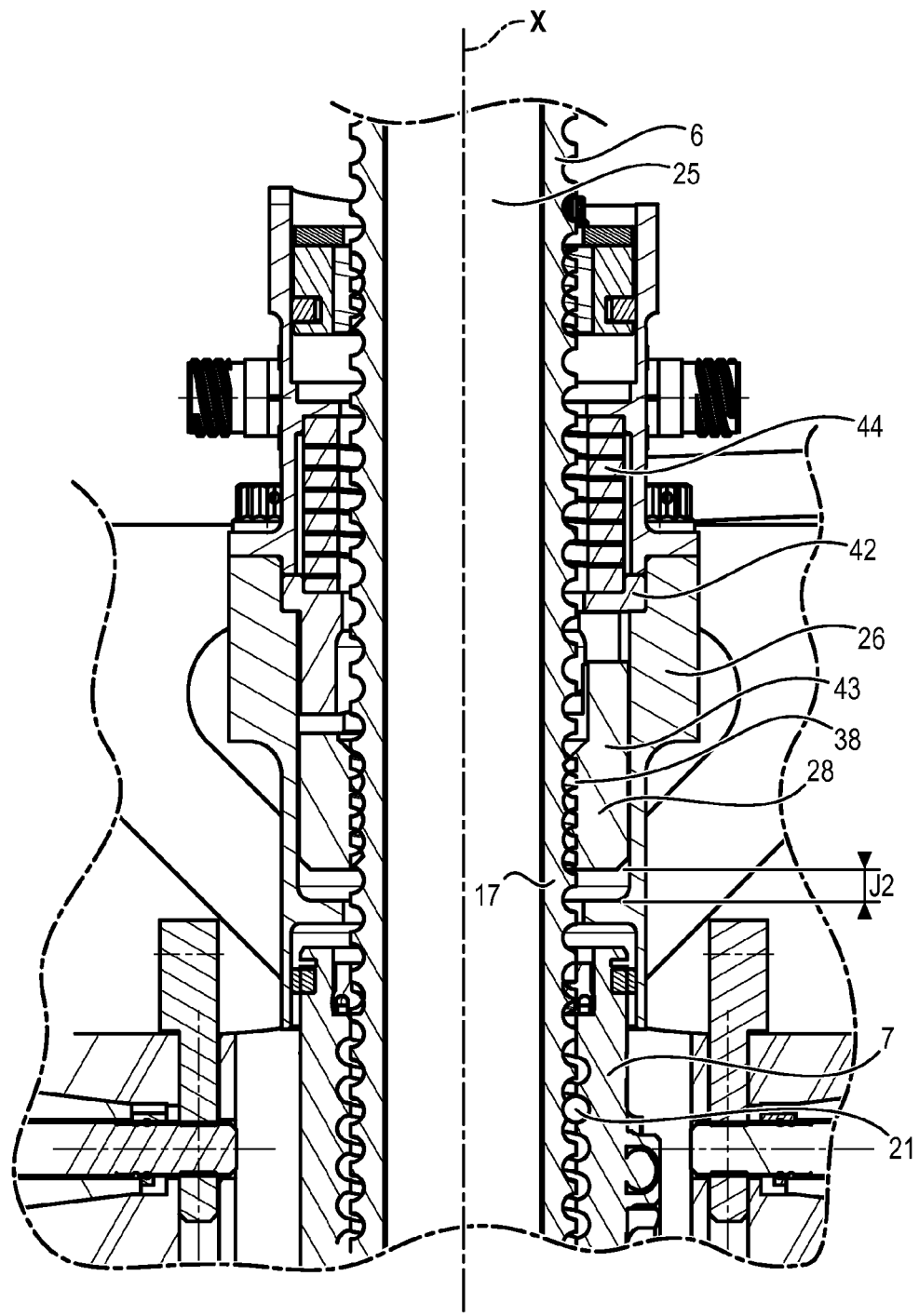
Figure 9:
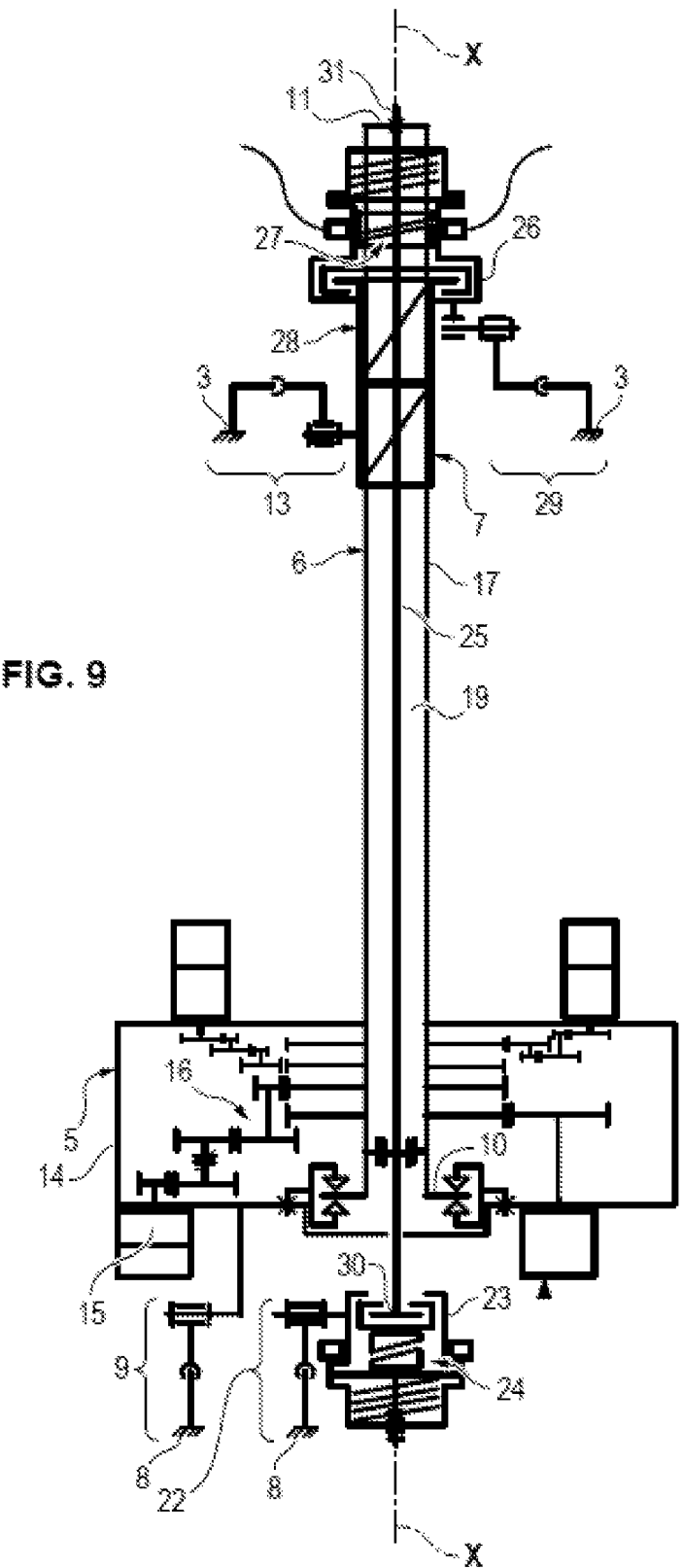
Figure 10:
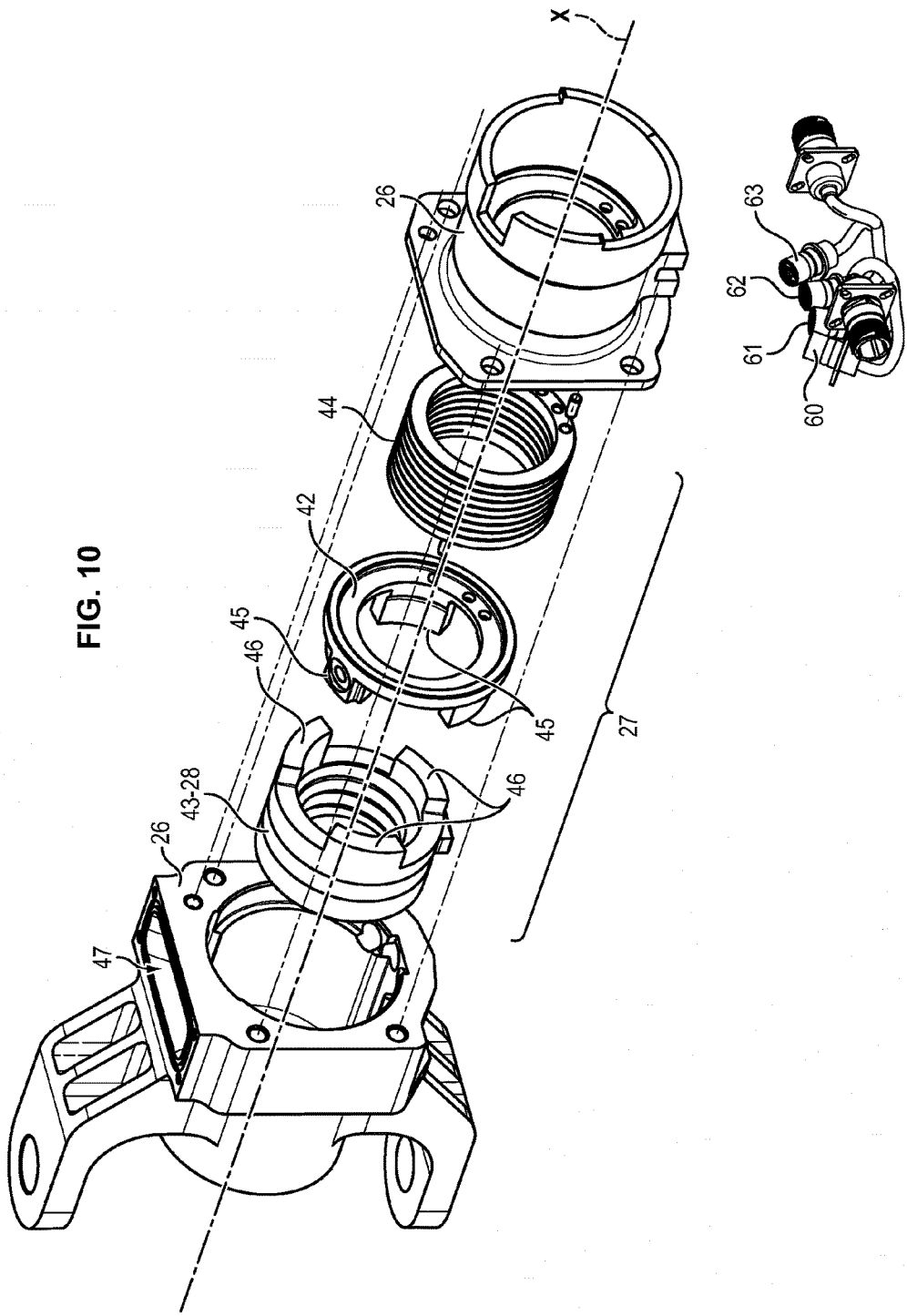
Figure 11:
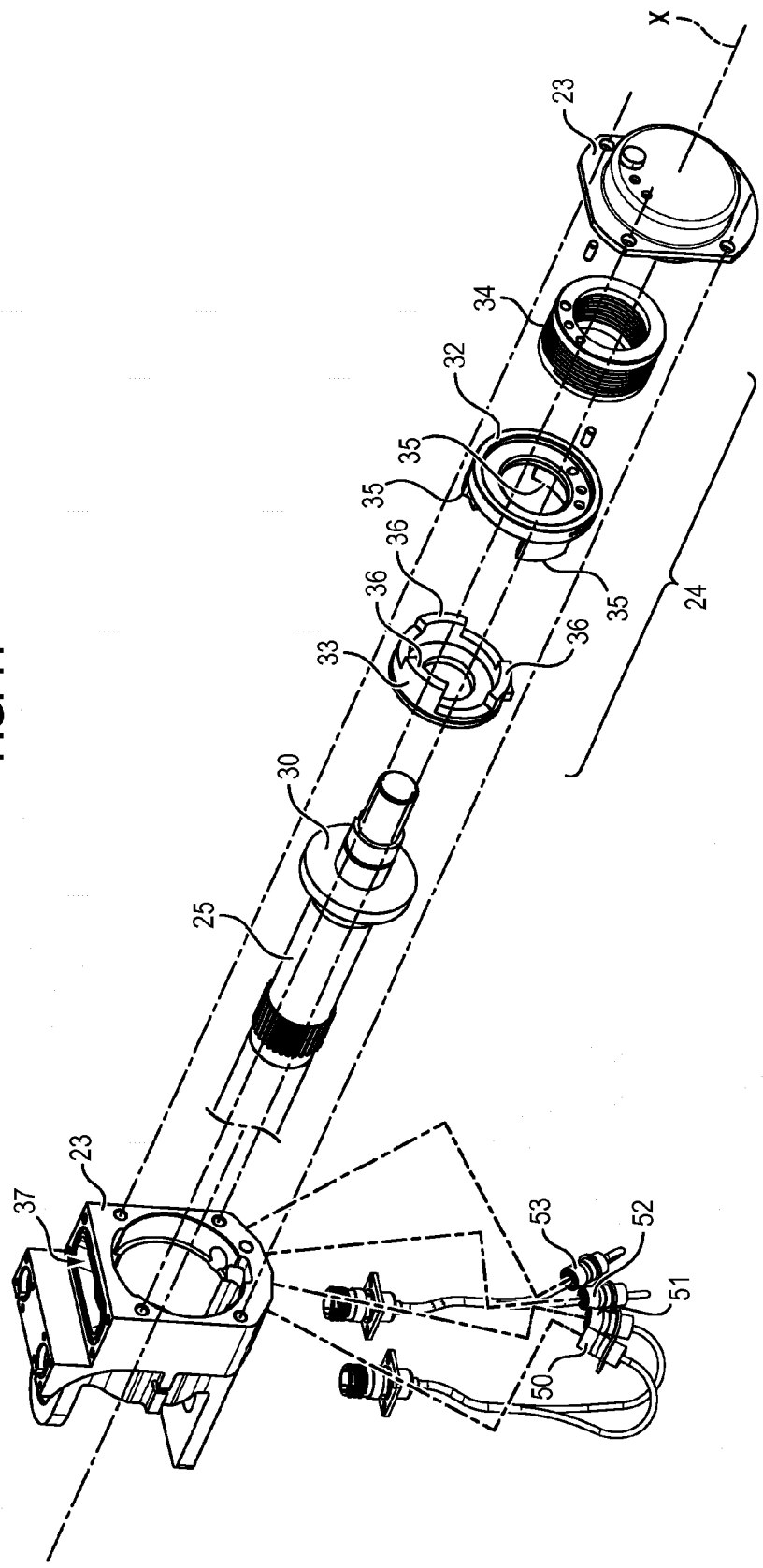
Figure 12:
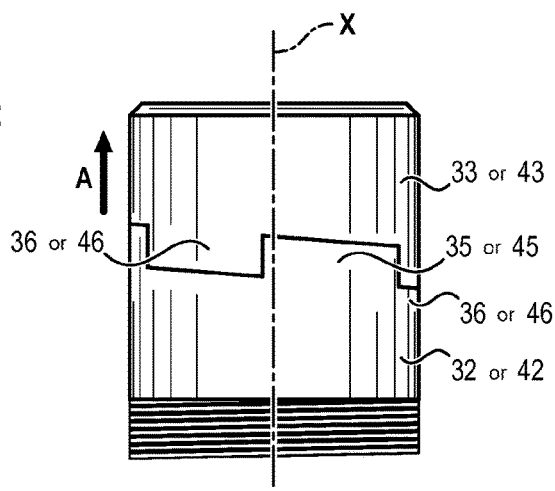
Figure 13:
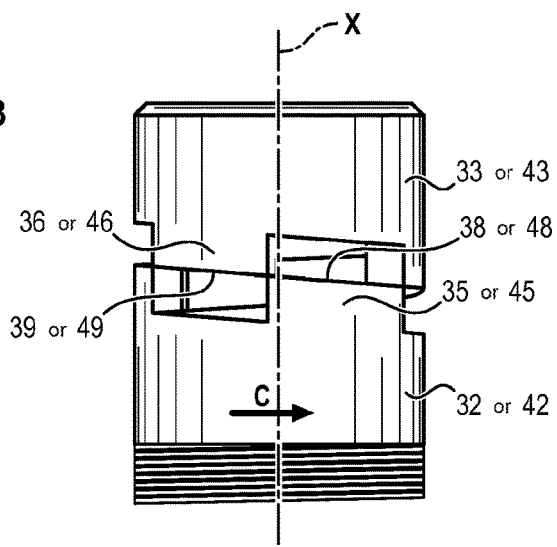
Figure 14:
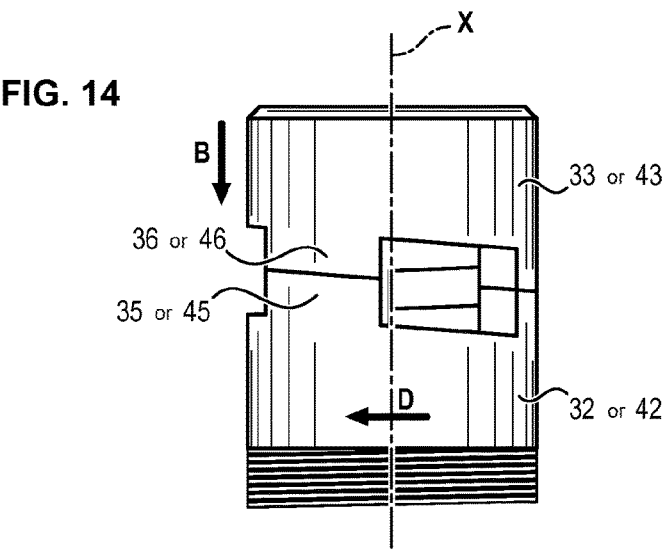

Other characteristics and advantages will emerge more clearly from the following description which is purely illustrative, and non-limiting and must be considered with respect to the appended figures, in which:

FIG. 1 is a general view of an aircraft comprising a horizontal stabilizer,

FIG. 2 schematically illustrates a horizontal stabilization assembly comprising a horizontal stabilizer and an associated actuator, FIGS. 3 to 6 schematically illustrate a control actuator of a horizontal stabilizer according to an embodiment of the invention, FIG. 7 is a detailed view, in section A-A, of a first clearance take-up device, FIG. 8 is a detailed view, in section A-A, of a second clearance take-up device, FIG. 9 schematically illustrates the control actuator of a horizontal stabilizer, FIG. 10 schematically illustrates different constituent parts of the first clearance take-up device, FIG. 11 schematically illustrates different constituent parts of the second clearance take-up device, FIGS. 12 to 14 schematically illustrates three configurations of a clearance take-up device.

DETAILED DESCRIPTION OF AN EMBODIMENT

In FIG. 1, the aircraft 1 shown is a plane comprising a horizontal stabilizer 3 movably mounted relative to the fuselage 8 of the plane to control the pitching of the plane.

As is illustrated in FIG. 2, the position of the horizontal stabilizer 3 is adjusted by an actuator 4 to have the horizontal stabilizer 3 pivot relative to the fuselage 8. The horizontal stabilizer 3 is rotatably mounted relative to the fuselage 8 of the plane around an axis Z. The actuator 4 comprises a motor control unit 5, a screw 6 and a nut 7.

The motor control unit 5 comprises an electric motor and a mechanical reduction assembly (not shown in this figure). The motor control unit 5 is connected to the fuselage 8 of the plane via a universal joint 9. The motor control unit 5 is adapted to drive the screw 6 in rotation relative to the fuselage 8 about an axis of rotation X. Also, the nut 7 is secured against rotation and is movable in translation relative to the fuselage 8.

The screw 6 has a first end 10 connected to the motor control unit 5 and a second end 11, opposite the first end 10.

The nut 7 is capable of cooperating with the screw 6 by way of helical grooves such that rotation of the screw 6 relative to the nut 7 causes translation of the nut 7 relative to the screw 6 in a direction parallel to the axis X of rotation of the screw 6.

The horizontal stabilizer 3 is connected to the nut 7 via a universal joint 12.

To adjust the position of the horizontal stabilizer 3 relative to the fuselage 8, the pilot controls the power to the motor control unit 5. The motor control unit 5 drives the screw 6 in rotation relative to the fuselage 8, the effect of which is to move the nut 7 in translation relative to the fuselage 8 along the screw 6. Displacement of the nut 7 in translation causes rotation of the horizontal stabilizer 3 relative to the fuselage 8 of the plane about the axis Z. According to the direction in which the screw 6 is driven in rotation, the horizontal stabilizer 3 is moved in a first direction (arrow A) or in a second direction (arrow B), opposite the first direction.

The actuator 4 is shown in more detail in FIGS. 3 to 9.

In these figures, the actuator 4 comprises a primary path and a secondary path, each path connecting the horizontal stabilizer 3 to the fuselage 8 of the plane.

The primary path comprises a first primary link assembly 9, a motor drive unit 5, a screw 6, a primary nut 7 and a second primary link assembly 13.

The motor control unit 5 comprises a housing 14, an electric motor 15 and a mechanical reduction assembly 16 to drive the screw 6 in rotation about an axis of rotation X.

The first primary link assembly 9 comprises a universal joint by which the housing 14 of the motor drive unit is connected to the fuselage 8 of the plane.

The screw 6 is rotatably mounted relative to the housing 14 about the axis X. The screw 6 has a first end 10 (or receiving end), intended to receive a drive torque, and a second end 11 (or free end), opposite the first end 10. The first end 10 of the screw 6 extends inside the housing 14 of the motor control unit 5, and is connected to the motor 15 by means of the mechanical reduction assembly 16. The screw 6 comprises a body 17 having a cylindrical outer surface in which is arranged a helical groove 18. Also, the screw 6 has a longitudinal bore 19 extending inside the body 17 of the screw 6.

The primary nut 7 extends about the body 17 of the screw 6. The primary nut 7 has a cylindrical inner surface in which a helical groove 20 is also arranged. The screw 6 and the primary nut 7 cooperate together by way of the helical grooves 18 and 20 housing balls 21 such that rotation of the screw 6 relative to the primary nut 7 concurrently powers translation of the primary nut 7 relative to the screw 6 according to the direction of the axis X.

The second primary link assembly 13 comprises a second universal joint by which the primary nut 7 is connected to the horizontal stabilizer 3.

The secondary path comprises a first secondary link assembly 22, a first housing 23 (or rod housing), a first clearance take-up device 24, a rod 25, a second housing 26 (or nut housing), a second clearance take-up device 27, a secondary nut 28 and a second secondary link assembly 29.

The first secondary link assembly 22 comprises a universal joint by which the rod housing 23 is connected to the fuselage 8 of the plane. The first primary link assembly 9 and the first secondary link assembly 22 have combined axes of rotation Y1 and Y2.

The rod 25 extends inside the screw 6, in the longitudinal bore 19 of the screw 6. The rod 25 has a first end 30 and a second end 31, opposite the first end 30. The first end 30 of the rod 25 is received in the rod housing 23 with an axial clearance J1 (clearance measured in the direction of the axis X) between the rod 25 and the rod housing 23. The second end 31 is attached to the second end 11 of the screw 6. In this way, the rod 25 is fixedly mounted with the screw 6.

More precisely, the rod 25 comprises at the first end 30 an end portion having an enlarged diameter. The end portion of enlarged diameter extends inside the rod housing 23. Also, the rod 25 is rotatably mounted relative to the rod housing 23 about the axis X.

The first clearance take-up device 24 extends inside the rod housing 23. The first clearance take-up device 24 comprises a first clearance take-up part 32, a second clearance take-up part 33 and an elastic return element 34 (FIG. 7).

The first clearance take-up part 32 is movably mounted in rotation relative to the nut housing 23 about the axis X, which is also the axis of rotation of the screw 6. The second clearance take-up part 33 is movably mounted in translation along the axis X relative to the nut housing 23. The elastic return element 34 comprises a torsion spring arranged to stress the first clearance take-up part 32 in rotation about the axis X.

As illustrated in FIG. 11, the first clearance take-up part 32 comprises teeth 35 adapted to engage with teeth 36 of the second clearance take-up part 33. More precisely, the first clearance take-up part 32 comprises three teeth 35. The second clearance take-up part 33 also comprises three teeth 36 adapted to be inserted between the three teeth 35 of the first clearance take-up part 32.

Also, the teeth 35 of the first clearance take-up part 32 have guide surfaces 38 inclined relative to the direction of the axis X, forming ramps. More precisely, the ramps 38 are helical ramps, having the axis X as axis.

Similarly, the teeth 36 of the second clearance take-up part 33 have guide surfaces 39 inclined relative to the direction of the axis X, forming ramps. The ramps 39 are also helical ramps, having the axis X as axis.

Besides, the rod housing 23 comprises a window 37 by which an operator can introduce a tool to move the first clearance take-up part 33 in rotation about the axis X.

The actuator 4 further comprises angular position sensors 50 to 53 for detecting the position of the first clearance take-up part 32 relative to the housing 23. The sensors 50 to 53 detect engagement of the secondary path and transmit information to the pilot. The sensors 50 to 53 are preferably contactless sensors, such as Hall-effect sensors, fixed on the rod housing 23. The actuator 4 comprises magnets fixed on the first clearance take-up part 32. The Hall-effect sensors 50 to 53 are capable of detecting the presence of magnets when the magnets are positioned facing the sensors.

The second secondary link assembly 29 comprises a universal joint by which the nut housing 26 is connected to the horizontal stabilizer 3. The second primary link assembly 13 and the second secondary link assembly 29 have coincident axes of rotation.

The secondary nut 28 extends about the body 17 of the screw 6. The secondary nut 28 has a cylindrical inner surface in which a helical groove is arranged 38. The secondary nut 28 cooperates with the screw 6 by way of the helical grooves 21 and 38 such that rotation of the screw 6 relative to the secondary nut 28 about the axis X causes translation of the secondary nut relative to the screw 6 along the axis X. In this way, rotation of the screw 6 concurrently causes identical translation of the primary nut and of the secondary nut 28 relative to the screw 6 according to the direction X.

The secondary nut 28 extends inside the nut housing 26, with an axial clearance J2 (clearance measured according to the direction of the axis X) between the nut housing 26 and the secondary nut 28.

The second clearance take-up device 27 extends inside the nut housing 26. The second clearance take-up device 27 is similar to the first clearance take-up device 24. The second clearance take-up device 27 comprises a first clearance take-up part 42, a second clearance take-up part 43 and an elastic return element 44. The first clearance take-up part 42 is movably mounted in rotation relative to the nut housing 26 about the axis X, which is also the axis of rotation of the screw 6. The second clearance take-up part 43 is movably mounted in translation along the axis X relative to the nut housing 26. The elastic return element 44 comprises a torsion spring arranged to urge the first clearance take-up part 42 in rotation about the axis X. In the embodiment illustrated in FIG. 10, the secondary nut 28 and the second clearance take-up part 43 are one and the same part.

As illustrated in FIG. 10, the first clearance take-up part 42 comprises teeth 45 adapted to engage with teeth 46 of the second clearance take-up part 43. More precisely, the first clearance take-up part 42 comprises three teeth 45.

The second clearance take-up part 43 also comprises three teeth 46 adapted to be inserted between the three teeth 45 of the first clearance take-up part 42.

Also, the teeth 45 of the first clearance take-up part 42 have guide surfaces 48 inclined relative to the direction of the axis X, forming ramps. More precisely, the ramps 48 are helical ramps, having the axis X as axis.

Similarly, the teeth 46 of the second clearance take-up part 43 have guide surfaces 49 inclined relative to the direction of the axis X, forming ramps. The ramps 49 are also helical ramps, having the axis X as axis.

Besides, the nut housing 26 comprises a window 47 by which an operator can introduce a tool to move the first clearance take-up part 43 in rotation about the axis X.

The actuator 4 also comprises angular position sensors 60 to 63 for detecting the position of the first clearance take-up part 42 relative to the housing 26. The sensors 60 to 63 can detect engagement of the secondary path and transmit information to the pilot. The sensors 60 to 63 are preferably contactless sensors, such as Hall-effect sensors, fixed on the nut housing 26. The actuator 4 comprises magnets fixed on the first clearance take-up part 42. The Hall-effect sensors 60 to 63 are capable of detecting the presence of magnets when the magnets are positioned facing the sensors.

In normal operation, the motor control unit 5 drives the screw 6 in rotation about the axis X, the effect of which is to move the primary nut 7 in translation along the screw 6 along the axis X. Translation movement of the primary nut 7 causes rotation of the horizontal stabilizer 3 relative to the fuselage 8 of the plane about the axis Z.

Since the rod 25 is secured in rotation with the screw 6, rotation of the screw 6 concurrently causes rotation of the rod 25 relative to the primary nut 7 and relative to the rod housing 23.

Also, another effect of rotation of the screw 6 is to move the secondary nut 28 in translation along the screw 6 along the axis X, and the two nuts 7 and 28 move simultaneously in translation along the screw 6.

Besides, as the rod housing 23 is connected to the fuselage 8 via the link assembly 22 having axes of rotation Y1 and Y2 coincident with the axes of rotation of the link assembly 9, the clearance J1 between the rod 25 and the rod housing 23 is kept constant.

Similarly, as the nut housing 26 is connected to the horizontal stabilizer 3 via the link assembly 29 having axes of rotation Y3 and Y4 coincident with the axes of rotation of the link assembly 13, the nut housing 26 is also moved in translation relative to the screw 6 such that the clearance J2 between the secondary nut 28 and the nut housing 26 is kept constant.

Due to the clearances J1 and J2 which exist both between the rod 25 and the rod housing 23 and also between the nut 28 and the nut housing 26, the components of the secondary path do not transmit any force between the fuselage 8 of the plane and the horizontal stabilizer 3. Forces applied to the actuator 4 are supported by the components of the primary path only.

In addition, during normal operation of the actuator 4, the first clearance take-up part 32 (respectively 42) of each clearance take-up device 24 (respectively 27) is in the cocked position, and the second clearance take-up part 33 (respectively 43) is in the first position, as illustrated in FIG. 12. In this configuration, the second clearance take-up part 33 (respectively 43) is engaged with the first clearance take-up part 32 (respectively 42) to keep the first clearance take-up part 32 (respectively 42) in the cocked position. The teeth 36 of the second clearance take-up part 33 (respectively 43) are inserted between the teeth 35 of the first clearance take-up part 32 (respectively 42) such that the second clearance take-up part 33 (respectively 43) prevents any rotational movement of the first clearance take-up part 32 (respectively 42) relative to the housing 23 in a first direction (arrow C).

In case of breaking of the first primary link assembly 9 or of the screw 6, the screw 6 is no longer connected to the fuselage 8 of the plane. The horizontal stabilizer 3, subjected to action of the air, exerts a traction force on the rod 25 of the secondary path. The consequence of this is that the rod 25 is moved in translation relative to the rod housing 23, displacement of the rod 25 tending to reduce the clearance J1 between the rod 25 and the rod housing 23. As the second clearance take-up part 33 is secured in translation with the rod 23, the second clearance take-up part 33 is moved in translation relative to the rod housing 23 according to the direction of the axis X in a first direction (arrow A). The second clearance take-up part 33 is moved from the first position (FIG. 12) to the second position (FIG. 13) in which the second clearance take-up part 33 is disengaged from the first clearance take-up part 32. In other words, the teeth 36 of the second clearance take-up part 33 are no longer inserted between the teeth 35 of the first clearance take-up part 32 and therefore are no longer an obstacle to rotation of the first clearance take-up part 32.

When the second clearance take-up part 33 is in the second position, the second clearance take-up part 33 enables rotation of the first clearance take-up part 34 relative to the housing 23.

Under the action of the elastic return element 34, the first clearance take-up part 32 is driven in rotation about the axis X in a first direction (arrow C). The first clearance take-up part 32 moves from the cocked position to a blocking position (FIG. 14) in which the first clearance take-up part 32 prevents return of the second clearance take-up part 33 towards the first position (arrow B).

Indeed, the teeth 35 of the first clearance take-up part 32 are facing the teeth 36 of the second clearance take-up part 33 such that the first clearance take-up part 32 prevents any displacement of the second clearance take-up part 33 relative to the housing 23 according to the direction of the axis X in a second direction (arrow B), opposite the first direction. The teeth 36 come into axial abutment (according to the direction of the axis X) against the teeth 35.

In this way, the clearance J1 between the rod 25 and the rod housing 23 is cancelled. Also, the clearance J1 is taken-up automatically due to the action of the elastic return element 34.

Also, during rotation of the first clearance take-up part 32 the helical ramps 38 of the first clearance take-up part 32 slide on the helical ramps 39 of the second clearance take-up part 33 such that the effect of rotation of the first clearance take-up part 32 in the first direction (arrow C) is to urge the second clearance take-up part 33 parallel to the axis X in the first direction (arrow A), so that the rod 25 is tightened against the rod housing 23.

Also, the elastic return element 34 urges the first clearance take-up part 32 and prevents any rotation of the first clearance take-up part in a second direction (arrow D), opposite the first direction.

In this configuration, the rod 25 is secured in translation with the rod housing 23 and transmits forces applied to the actuator 4 between horizontal stabilizer 3 and the fuselage 8 via the first secondary link assembly 22. So the secondary path takes over the primary path.

During maintenance of the actuator 4, it is possible to manually guide the device in its initial configuration (FIG. 12) by introducing a tool via the window 37 arranged in the rod housing 26 and by driving the first clearance take-up part 33 in rotation in the second direction (arrow D) against the force exerted by the elastic return element 34.

The second clearance take-up device 27 operates in the same way as the first clearance take-up device 24.

In a similar way, in case of breaking of the second primary link assembly 13 or of the primary nut 7, the screw 6 is no longer connected to the fuselage of the plane 13. The horizontal stabilizer 3, subjected to the action of air, exerts a traction force on the secondary nut 28 of the secondary path. The consequence of this is that the secondary nut 28 is moved in translation relative to the nut housing 26.

As the second clearance take-up part 43 is secured in translation with the secondary nut 28, the second clearance take-up part 43 is moved in translation relative to the nut housing 26 in a first direction (arrow A), displacement of the second clearance take-up part 43 tending to reduce the clearance J2 between the nut 28 and the nut housing 26. The second clearance take-up part 43 moves from the first position (FIG. 12) to the second position (FIG. 13) in which the second clearance take-up part 43 is disengaged from the first clearance take-up part 44.

When the second clearance take-up part 43 is in the second position, the second clearance take-up part 43 enables rotation of the first clearance take-up part 42 relative to the nut housing 26.

Under the action of the elastic return element 44, the first clearance take-up part 42 is driven in rotation in a first direction (arrow C). The first clearance take-up part 42 moves from the cocked position to a blocking position (FIG. 14) in which the first clearance take-up part 42 prevents return of the second clearance take-up part 43 towards the second position (Fleche B).

Indeed, the teeth 45 of the first clearance take-up part 42 are facing the teeth 46 of the second clearance take-up part 43 such that the first clearance take-up part 42 prevents any displacement of the second clearance take-up part 43 relative to the housing 26 in a second direction (arrow B), opposite the first direction.

In this way, the clearance J2 between the secondary nut 28 and the nut housing 26 is cancelled. Also, the clearance J2 is taken-up automatically due to action of the elastic return element 44.

Also, the helical ramps 48 and 49 of the clearance take-up parts 42 and 43 cooperate together such that the effect of rotation of the first clearance take-up part 42 in the first direction (arrow C) is to move the second clearance take-up part 43 in translation according to the direction of the axis X in the first direction (arrow B) so as to tighten the secondary nut 28 against the nut housing 26.

In this configuration, the secondary nut 28 is secured to the nut housing 26 and transmits forces applied to the actuator 4 between the horizontal stabilizer 3 and the fuselage 8 via the second secondary link assembly 29. In this way, the secondary path takes over the primary path.

The invention claimed is:

1. An actuator for controlling a horizontal stabilizer of an aircraft, comprising:
    a primary path comprising a screw and a primary nut, the primary nut cooperating with the screw such that rotation of the screw relative to the primary nut along an axis of rotation causes translation of the primary nut relative to the screw along the axis of rotation to move the horizontal stabilizer,
    a secondary path comprising a secondary part, and a housing, the secondary part mounted in the housing with a clearance between the secondary part and the housing,
    wherein the secondary path further comprises a clearance take-up device, the clearance take-up device comprising a clearance take-up part having a tightening ramp inclined relative to the axis of rotation, the clearance take-up device arranged, in case of breaking of the primary path causing displacement of the secondary part relative to the housing along the axis of rotation in a first direction tending to reduce a clearance between the secondary part and the housing, to move the clearance take-up part towards a blocking position in which the clearance take-up part prevents displacement of the secondary part relative to the housing in a second direction, opposite the first direction, the clearance take-up part tightening the secondary part against the housing by means of the tightening ramp so as to keep the secondary part in contact with the housing.

2. The actuator according to claim 1, wherein the clearance take-up part is rotatably mounted relative to the housing between a cocked position in which the clearance take-up part enables the clearance between the secondary part and the housing, and the blocking position.

3. The actuator according to claim 2, wherein the clearance take-up part is rotatably mounted about an axis of rotation parallel to the axis of rotation of the screw.

4. The actuator according to claim 2, wherein the tightening ramp is a helical ramp.

5. The actuator according to claim 1, wherein the clearance take-up device comprises an elastic return element arranged to urge the clearance take-up part towards the blocking position.

6. The actuator according to claim 5, wherein the elastic return element comprises a torsion spring.

7. The actuator according to claim 1, wherein the clearance take-up device comprises a second clearance take-up part movably mounted in translation relative to the housing, between a first position in which the second clearance take-up part is engaged with the first clearance take-up part to keep the first clearance take-up part in a cocked position, and a second position in which the second clearance take-up part is freed from the first clearance take-up part to enable displacement of the first clearance take-up part towards the blocking position.

8. The actuator according to claim 7, wherein the first clearance take-up part comprises teeth and the second clearance take-up part comprises teeth capable of engaging with the teeth of the first clearance take-up part when the second clearance take-up part is in the first position so as to prevent displacement of the first clearance take-up part towards the blocking position.

9. The actuator according to claim 7, wherein the second clearance take-up part comprises a ramp capable of cooperating with the ramp of the first clearance take-up part to tighten the secondary part against the housing.

10. The actuator according to claim 1, wherein the secondary part is a rod extending inside the screw.

11. The actuator according to claim 10, wherein the primary path comprises a primary universal joint to connect the screw to a fuselage of the aircraft, and the secondary path comprises a secondary universal joint to connect the housing to the fuselage, the primary universal joint and the secondary universal joint having coincident axes of rotation.

12. The actuator according to claim 1, wherein the secondary part is a secondary nut capable of cooperating with the screw, such that rotation of the screw relative to the secondary nut along an axis of rotation causes translation of the secondary nut relative to the screw along the axis of rotation.

13. The actuator according to claim 12, wherein the primary path comprises a primary universal joint to connect the primary nut to the horizontal stabilizer, and the secondary path comprises a secondary universal joint to connect the housing to the horizontal stabilizer, the primary universal joint and the secondary universal joint having coincident axes of rotation.

14. The actuator according to claim 1, wherein the housing comprises a window enabling insertion of a tool inside the housing to return the first clearance take-up part in a cocked position.

15. The actuator according to claim 1, comprising one or more position sensors for detecting the position of the first clearance take-up part.

16. The actuator according to claim 15, wherein the first clearance takeup part comprises one or more magnets and the position sensor(s) are Hall-effect sensors for detecting the presence of the magnet(s) facing the sensor(s).

17. A horizontal stabilization assembly of an aircraft, comprising:
    a horizontal stabilization rudder of the aircraft, and
    the control actuator according to claim 1 to move the horizontal stabilizer.

* * * * *